(12) United States Patent
Paripally et al.

(10) Patent No.: US 12,101,581 B2
(45) Date of Patent: Sep. 24, 2024

(54) METHOD AND SYSTEM FOR RECORDING A MAIL SCREENING PROCESS

(71) Applicant: Tyco Fire & Security GmbH, Neuhausen am Rheinfall (CH)

(72) Inventors: Gopal Paripally, North Andover, MA (US); Jason M. Ouellette, Sterling, MA (US); Richard Focke, Andover, MA (US); Brian Richard, Lunenburg, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/712,814

(22) Filed: Apr. 4, 2022

(65) Prior Publication Data

US 2023/0319238 A1    Oct. 5, 2023

(51) Int. Cl.
| | |
|---|---|
| *H04N 7/18* | (2006.01) |
| *G05B 19/042* | (2006.01) |
| *G06V 20/52* | (2022.01) |
| *G07C 9/20* | (2020.01) |
| *G08B 21/02* | (2006.01) |

(52) U.S. Cl.
CPC .......... *H04N 7/183* (2013.01); *G05B 19/042* (2013.01); *G06V 20/52* (2022.01); *G07C 9/20* (2020.01); *G08B 21/02* (2013.01); *G05B 2219/2614* (2013.01)

(58) Field of Classification Search
CPC ...... H04N 7/183; G06V 20/52; G05B 19/042; G08B 21/02
See application file for complete search history.

(56) References Cited

U.S. PATENT DOCUMENTS

| | | | |
|---|---|---|---|
| 2003/0144800 A1* | 7/2003 | Davis | B07C 1/00 702/22 |
| 2016/0033404 A1 | 2/2016 | Suzuki et al. | |
| 2016/0252646 A1* | 9/2016 | Sarraiocco | G06V 10/25 382/103 |
| 2017/0103633 A1* | 4/2017 | Khire | G08B 17/125 |
| 2017/0187932 A1* | 6/2017 | Marchese | G01J 1/0411 |

(Continued)

FOREIGN PATENT DOCUMENTS

| | | |
|---|---|---|
| WO | 8103594 A1 | 12/1981 |
| WO | 2009023314 A2 | 2/2009 |

OTHER PUBLICATIONS

International Search Report and Written Opinion in PCT/US2023/017136, mailed Jul. 18, 2023, 12 pages.

*Primary Examiner* — Kathleen V Nguyen

(74) *Attorney, Agent, or Firm* — ARENTFOX SCHIFF LLP

(57) ABSTRACT

A method for recording mail screening process includes receiving, by a processor of a recording device, a first image of a mail item placed into an inspection zone of a mail screening device from a first image sensor of the mail screening device. A video stream capturing screening of the mail item is received by the processor of the recording device from a second image sensor of the mail screening device. The first image of the mail item and the video stream of the mail item are analyzed by the recording device to determine if the mail item contains a security threat. A notification is generated, by the processor of the recording device, in response to determining that the mail item contains the security threat.

21 Claims, 6 Drawing Sheets

(56) References Cited

U.S. PATENT DOCUMENTS

2020/0191991 A1* 6/2020 Morton ................ G01V 5/0083
2021/0006571 A1* 1/2021 Yi ......................... H04L 63/102
2021/0323696 A1* 10/2021 Zhang ...................... B62B 3/16

* cited by examiner

METHOD AND SYSTEM FOR RECORDING A MAIL SCREENING PROCESS

TECHNICAL FIELD

The present disclosure generally relates to mail screening systems, and more specifically, to methods and systems for recording a mail screening process.

BACKGROUND

Mail screening is a technique which allows seeing through envelopes and parcels, enabling the detection of suspicious items such as powders or electrical circuits prior to opening the mail and exposing such content. Mail screening devices may use radiation in the long terahertz (THz) wavelengths, as the penetration depth of the THz radiation is long enough to see through envelopes and parcels.

There remains a need in the field to practically and efficiently screen mail, parcels or similar objects.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In accordance with one aspect, there is provided a method for recording a mail screening process. Terahertz inspection is used to localize potential suspicious areas by imaging the contents inside an envelope or parcel. The mail screening process employs a first image sensor and a second image sensor, preferably allowing to record mail screening process.

One example implementation relates to recording a mail screening process. One aspect of the method includes receiving, by a processor of a recording device, a first image of a mail item placed into an inspection zone of a mail screening device from a first image sensor of the mail screening device. A video stream capturing screening of the mail item is received by the processor of the recording device from a second image sensor of the mail screening device. The first image of the mail item and the video stream of the mail item are analyzed by the recording device to determine if the mail item contains a security threat. A notification is generated, by the processor of the recording device, in response to determining that the mail item contains the security threat.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
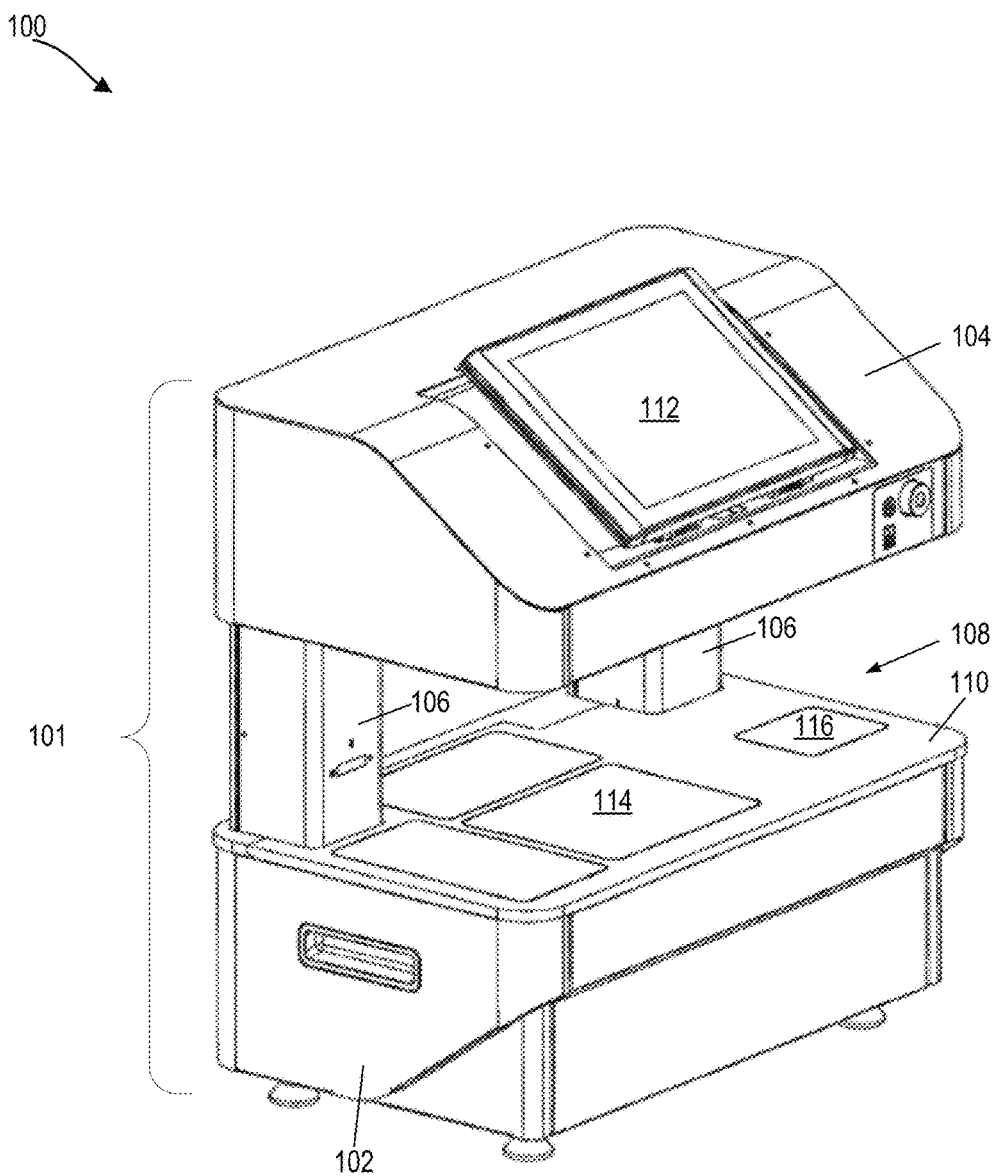
FIG. 1 is an example of a front isometric view of a mail screening apparatus, in accordance with aspects of the present disclosure.
Figure 2:
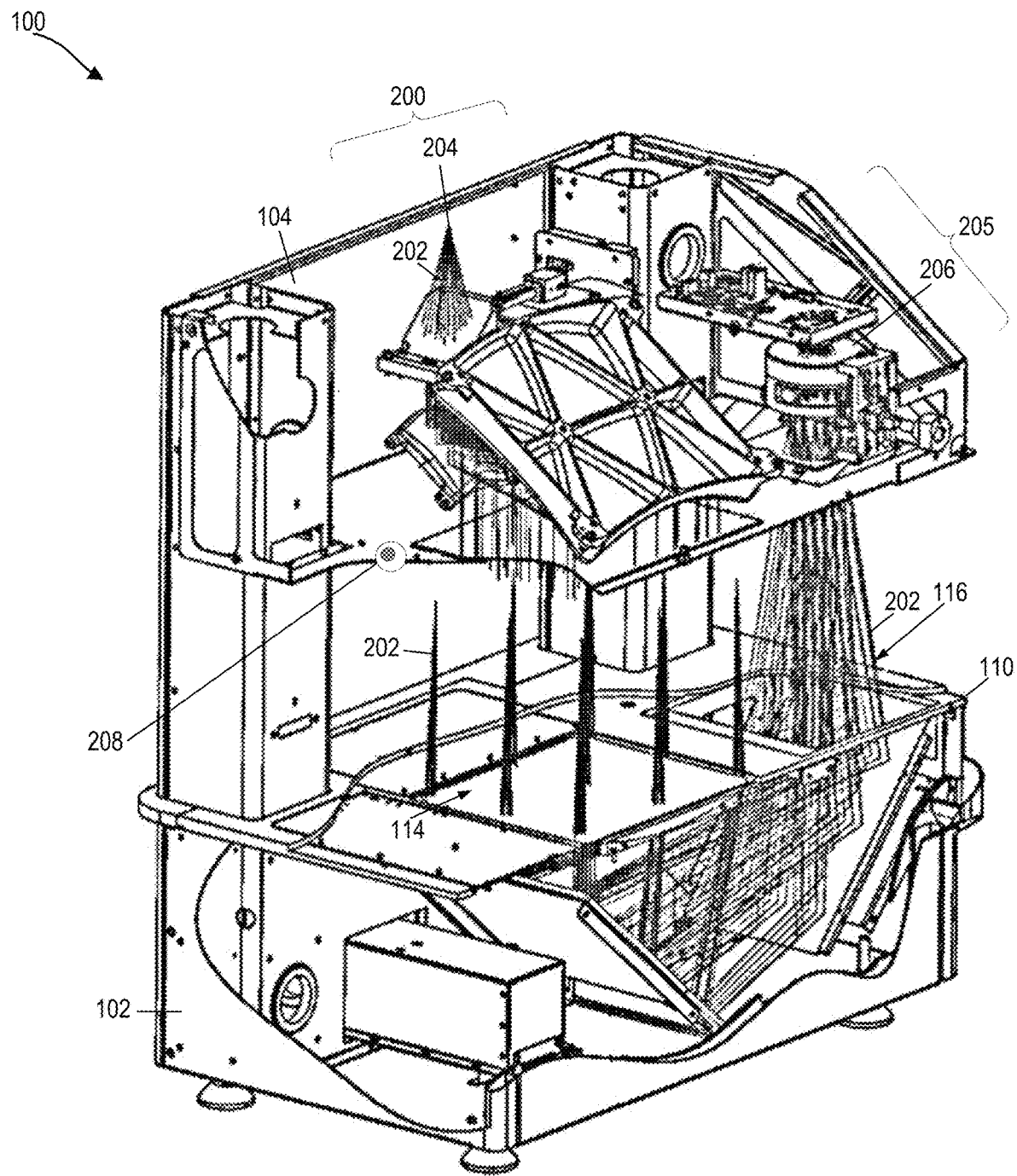
FIG. 2 is an example of a front isometric view in partial transparency of the mail screening apparatus, in accordance with aspects of the present disclosure.

Referring to FIGS. 1 and 2, there is shown a mail screening apparatus 100 according to one aspect of the present disclosure. In the illustrated aspect the mail screening apparatus 100 advantageously combines metal detection and THz imaging to perform the inspection of the mail. The THz inspection aspect is used to obtain an image of the contents inside the envelope or parcel, to localize potential suspicious areas. The mail screening apparatus 100 may include an additional image sensor. This additional image sensor may be configured to record the mail screening process and the contents of the mail item.

It will be readily understood that variants of a mail screening apparatus such as described herein may be used for the screening of mail items of various types such as envelopes, parcels and the like.

Referring more particularly to FIG. 1, in some aspects, the mail screening apparatus 100 is a stand-alone device incorporating all of the components described below in a single casing 101. Preferably, the casing 101 includes a base 102 and a top housing 104 mounted over the base 102 in a spaced-apart relationship, for example, using frame members such as a pair of frame posts 106. The free space between the base 102 and the top housing 104 defines a mail inspection bay 108. The mail inspection bay 108 is preferably large enough to allow the inspected mail items to be handled within the bay. The top wall of the base 102 defines an inspection counter 110 on which a mail item can be placed for inspection. The inspection counter 110 is separated into one or more inspection zones. For illustrative purposes only, FIG. 1 shows two different inspection zones 114 and 116. However, in various configurations, the mail screening apparatus 100 may include only one inspection zone (e.g., first inspection zone 114) or more than two inspection zones 114, 116. The inspection counter 110 can support a mail item to be screened at any of the inspection zones 114-116. As explained further below, the inspection counter 110 allows light therethrough. An opening in the back central section of the base 102, here defined by the free space between the frame posts 106, allows for an optional conveyor belt (not shown).

As seen in FIG. 1, a display 112 is preferably provided to allow a user to visualize the inspection results of a mail item positioned in one of the inspection zones 114-116. The display 112 is preferably integrated in a front portion of the top housing 104 for easy viewing by a user positioned in front of the mail screening apparatus 100. The display 112 may be embodied by a Liquid Crystal Display (LCD) screen, a touchscreen, etc. Optionally, the display 112 may be mounted on the top housing 104 so as to be pivotable along at least one axis, to adapt to the position of the user in front of the mail screening apparatus 100. In some implementations, the display 112 may be omitted from the mail screening apparatus and a connection to a separate visualizing device may be provided instead, such as a monitor, television, computer or similar device that may be configured to display the contents of a scanned mail item.

In an aspect, the display 112 may include one or more buttons that users can press in response to detecting a potential security threat. For example, if the user ascertains that a mail item contains a weapon or suspicious powder, they may press a corresponding button on the display 112. In an aspect, the display 112 may render a separate button for each of the following security threats: liquids, powder, weapons, explosives, radiation and suspect material detection. In one example, these buttons may comprise virtual buttons displayed on a touchscreen display 112. In an alternative example, these buttons may comprise physical buttons on the display 112. The aforementioned list of buttons is presented for illustrative purposes only, and is not meant to be a limitation of the present disclosure.

The mail screening apparatus 100 may also include a processing unit (not shown in FIG. 1) that is configured to perform a processing of the first image in order to automatically identify a security threat. In an aspect, the processing unit may be configured to generate a notification in response to determining that the mail item contains the security threat. In other words if a security threat is detected in the examined mail item (such as a powder or a gun), in response, the processing unit may generate a corresponding event notification (as described below).

Referring to FIG. 2, the mail screening apparatus 100 includes a light generating assembly 200 mounted in the top housing 104 and configured to generate an inspection light beam 202 and project the inspection light beam 202 towards the base 102 through the inspection zone 112. In the illustrated aspect, the light generating assembly 200 includes a light source 204 mounted within the top housing 104 and emitting the inspection light beam 202 (referred to hereinbelow as the "light beam" for simplicity). In some aspects, the light source 204 may emit the light beam at an optical frequency in the terahertz range, for example at a frequency corresponding to a wavelength between 700 µm and 1075 µm. In some aspects, the optical frequency of the inspection light beam may correspond to a wavelength between 50 µm and 3 mm. It will be readily understood by one skilled in the art that the term "light source" is meant to encompass stand-alone devices as well as more complex optical assemblies or systems comprising a plurality of components cooperating together to provide the desired light beam. In other aspects, the light source may for example be a Schottky diode or a GaAs diode emitting radiation at a suitable wavelength.

Still referring to FIG. 2, a light collecting assembly may further include a first image sensor 206 coupled with the top housing 104 and configured to receive and detect the inspection light beam 202 and configured to capture a first image of a mail item. The first image sensor 206 may comprise a 2D image sensor preferably sensitive in a suitable portion of the wavelength region spanning from 700 µm to 1075 µm and preferably with a resolution of at least 320×240 pixels. An example of a suitable image sensor is the one used in the IRXCAM-384THz camera module available from INO (Quebec, Canada), sensitive to the THz waveband. In an aspect, the first image sensor 206 may be used with two different focus settings—for example, to replace the two different inspection zones 114, 116, as described below.

Advantageously, the mail screening apparatus 100 as described above may be operable in either a "Normal" or a "Zoomed" mode. In the Normal mode, a mail item to be inspected is positioned in the primary inspection zone 114, and the focus of the first image sensor 206 may be adjusted so that the image in the primary inspection zone 114 is in focus on the first image sensor 206. The secondary inspection zone 116 is left free of any obstruction, so that the light beam reaching the first image sensor 206 provides images of the contents of the mail disposed in the primary inspection zone 114. Similarly, in the Zoomed mode a mail item to be inspected is positioned in the secondary inspection zone 116, the focus of the first image sensor 206 may be adjusted so that the image in the secondary inspection zone 116 is in focus on the first image sensor 206. In this case the primary inspection zone 114 is left free of any obstruction.

In an aspect, the mail screening apparatus 100 may further include a second image sensor 208, such as a video camera configured to provide an RGB (Red, Green, Blue) view. In an aspect, the second image sensor 208 may be physically mounted to the casing 101 of the mail screening apparatus 100. The second image sensor 208 may be configured to record the mail screening process to determine how a mail item (piece of mail) was handled/scanned and what exactly was seen in the mail item. In other words, the second image sensor 208 may be used to provide enhanced situational awareness. For example, the second image sensor 208 may record names, mailing addresses and/or any additional information that can be found on the mail item being inspected. In other words, the second image sensor 208 may be configured to record a view of what users are seeing on the mail item, while the first image sensor 206 provides a view of the content of the same mail item. In an aspect, both views may be provided side by side to users of the security management system 402 (shown in FIG. 4), enabling the ability for users of the security management system 402 to see both the scanning process and handing as well as the scan results in real time. This comprehensive automatic recording may enable later investigations of the screening process to ensure the screening process was performed as expected.

In an aspect, the processing unit of the mail screening apparatus 100 may be able to analyze the image provided by the first image sensor 206 in order to detect a security threat, such as, but not limited to liquids, powder, weapons, explosives, radiation and suspect material.

Figure 4:
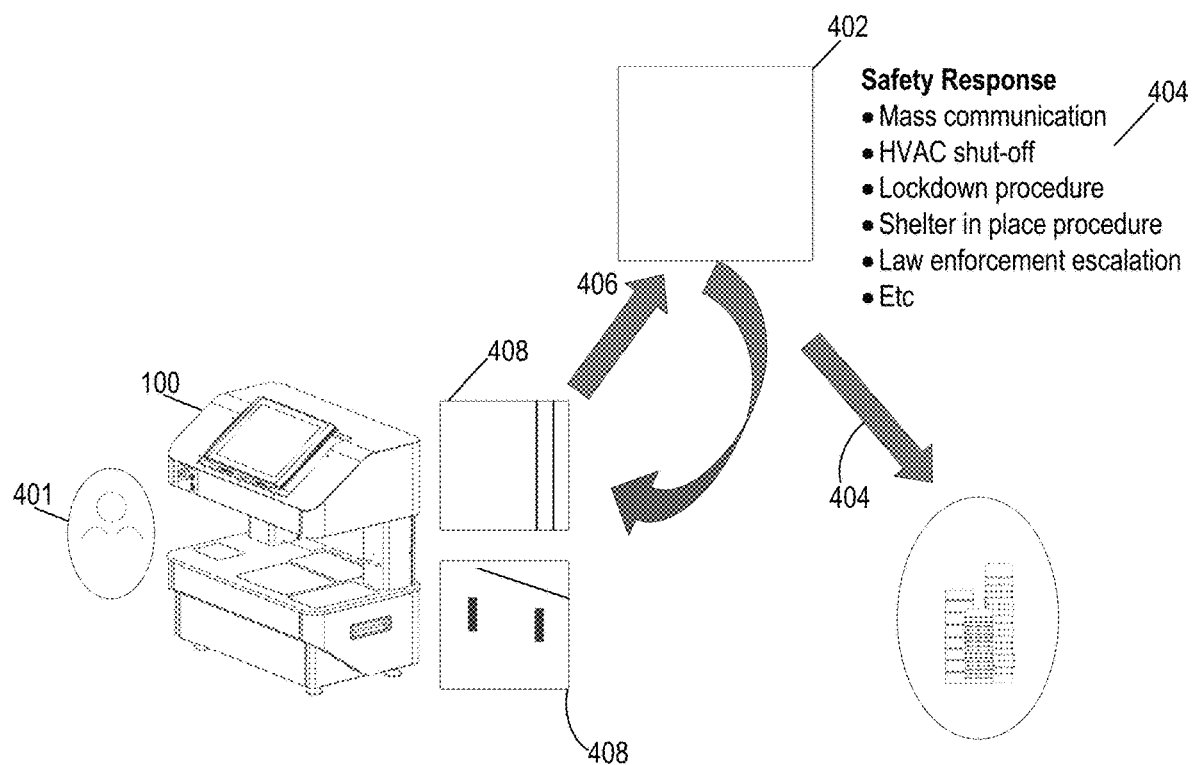
FIG. 4 is an example of a diagram illustrating integration of the mail screening apparatus with a security management system in accordance with aspects of the present disclosure.

In an aspect, the processing unit of the mail screening apparatus 100 may be configured to exchange data and/or video feed (e.g., HDMI output) with a centralized video surveillance system (e.g., a security management system 402 shown in FIG. 4). The video surveillance system may be used to keep watch over physical areas to assist in identifying events of interest. Such events, and associated data, can relate to maintaining safety and security, mitigating risk, increasing operational efficiency, preventing loss of products or revenue, gathering business intelligence, and a variety of other applications. For example, the mail screening apparatus 100 may use an Application Programming Interface (API) to access the video surveillance system.

Figure 3:
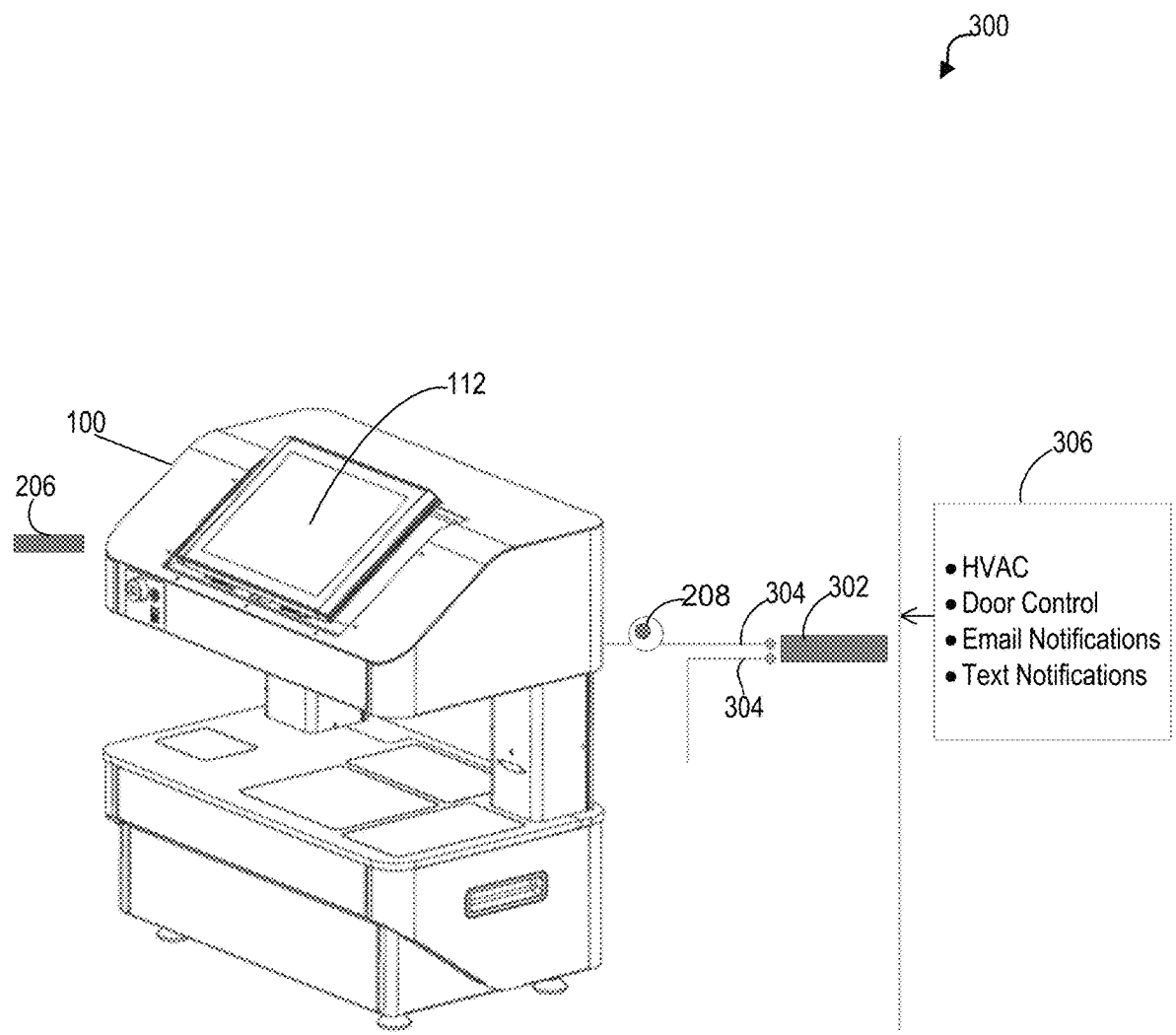
FIG. 3 is an example of a schematic illustrating a mail screening system in accordance with aspects of the present disclosure.

FIG. 3 is an example of a schematic illustrating a mail screening system in accordance with aspects of the present disclosure. In FIG. 3, the mail screening system 300 may comprise the mail screening apparatus 100 described above communicatively coupled with a digital video processor (DVP) 302. More specifically, one or more video inputs 304 may be communicatively coupled with the DVP 302, and event notification outputs 306 that may be communicatively coupled directly or indirectly, for example through a network 308 such as, for example, the internet, wireless network, and the like to receive notification messages from the DVP 302. The video inputs 304 may comprise the first image sensor 206 and the second image sensor 208 of the mail screening apparatus 100.

The DVP 302 may comprise a digital video recorder, with built in or added encoder, having digital video processing circuitry or a digital video recorder combined with separate encoder and processor. The DVP 302 may comprise conventional digital video recording and processing hardware, configured with software for carrying out the functions disclosed here to receive frames of video output from one or more of the video inputs 304, detect security threats and trigger a notification message if the security threat is detected. For example, the DVP 302 may comprise a video edge device, a laptop or a computer.

By way of example only, the DVP 302 may be able to or have the capacity to contain approximately 30 minutes of historic video and/or audio data and/or one or more snapshots. Various other aspects may comprise a storage capacity that may depend on business needs and may range anywhere between a month and multiple years of historic video and/or audio data, although a variety of other durations might apply under specific circumstances. In an aspect, the live video feeds may be received concurrently. In an aspect, two or more different video feeds may be combined by the DVP 302 for analytical purposes. In an aspect, the live video feeds may be uploaded to a particular server and/or the cloud. Advantageously, the historic video data may be used for user training purposes, for example.

The event notification outputs 306 may be integrated with other systems, such as, but not limited to building automation systems. The building automation systems may enable commercial Heating Ventilating and Air Conditioning (HVAC), lighting, security and protection systems to communicate on a single platform.

In an aspect, the DVP 302 may be configured to process video output from one or more of the video inputs 304, detect security threats independently of the user of the mail screening apparatus 100, based on the video output, and trigger an alert message if any type of security threat is detected.

FIG. 4 is an example of a diagram illustrating integration of the mail screening apparatus with a security management system in accordance with aspects of the present disclosure. The event notification outputs 306 shown in FIG. 3 may be communicatively coupled directly or indirectly with a security management system 402, such as, but not limited to, a video surveillance system. In an aspect, the security management system 402 may be integrated with other systems. In response to suspecting that the mail item examined by the mail screening apparatus 100 contains a security threat, the security management system 402 may automatically initiate a security response action 404. As shown in FIG. 4, the security response action 404 may include, but is not limited to, mass communication, HVAC shut-off, lockdown procedure, shelter in place procedure, law enforcement escalation, and the like. For example, in response to receiving the notification from the mail screening apparatus 100 indicating that a suspicious powder was detected inside the mail item, the security management system 402 may verify that the detected powder is suspicious and may communicate with the building automation system to initiate the security response action, such as, modify settings of a HVAC system (e.g., HVAC shut-off, reverse exhaust and the like). In various cases, users, such as mailroom operators 401, may exercise their judgment to determine if the threat is real. In an aspect, the type of notification 406 sent by the mail screening apparatus 100 may depend on a button pressed by the user 401 during the screening process, as described above. Mass communication response may include, but is not limited to the security management system 402 sending an emergency alert notification to a warning system, as described below. In an aspect, the escalation procedure may include the security management system 402 sending an emergency notification to emergency medical providers, law enforcement departments, fire departments, and the like.

In an aspect, the security management system 402 and/or the DVP 302 may be configured to employ one or more event notification rules. The one or more event notification rules may be associated with specific security threats and may be predefined based on the environment in which the security management system 402 operates. An event notification rule associated with a specific security threat may specify a notification disable time. Applying one or more event notification rules may include determining one or more event notification rules applicable to a particular type of detected security threat. Each event notification rule, when applied, identifies one or more security response actions 404 to be triggered in response to the detected event. It should be noted that the security response actions 404 may include a variety of actions that may be configurable based on the environment in which the mail screening apparatus 100 is situated. These security response actions 404 may be performed based on a feedback from the user 401 of the mail screening apparatus 100 and/or the user of the security management system 402. For example, particular security response action 404 may be cancelled based on a response from at least one of the aforementioned users. Performing security response action 404 based on feedback from one or more of the users may include resending the event notification 406 after a specified time interval when the feedback is a failure to respond to the event notification 406. Performing security response action 404 based on feedback from one or more of the users may include identifying one or more additional security response actions 404 that need to be performed.

As another non-limiting example, in response to receiving the notification 406 identifying the detected security threat, the security management system 402 may modify room access control rules for the room where the mail screening apparatus 100 is situated. In an aspect, modifying the room access control rules may include selectively granting access to the room based on security credentials. The access permissions may be updated by the security management system 402 based on rules and thresholds that include as at least one variable presence or contextual information associated with a detected security threat. The presence of security threat may be analyzed to trigger a credential update process for a particular user or other users within the access control system. For example, if the security management system 402 processes the video feed 408 provided by the mail screening apparatus 100 and determines that the security threat is credible, the security management system 402 may update the access permissions to allow all people exit the room and only allow first responders to enter the room until the detected security threat is cleared, as part of the shelter in place and/or lockdown procedure. In an aspect, the modified access permissions may require a combination of an access card and a pin number, a combination of an access card and biometrics information, and the like.

As yet another non-limiting example, in response to receiving the notification 406 identifying the detected security threat, the security management system 402 may modify settings of one or more additional image capture devices (e.g., security cameras) mounted in the room where the mail screening apparatus 100 is situated. In certain exemplary aspects, security management system 402 may be configured to control the point/tilt/zoom (PTZ) function of these image capture devices. The security management system 402 may be configured to change the field of view of that particular image capture device. For example, the field of view may change from a narrow view (e.g., the exit door) to a wide view (e.g., view of the entire room), or may be zoomed in to have a better view of a particular person and/or mail item in the room, if the security threat is detected. The video feed 408 from these additional image capture devices may also be included as video inputs 304 shown in FIG. 3.

Figure 5:
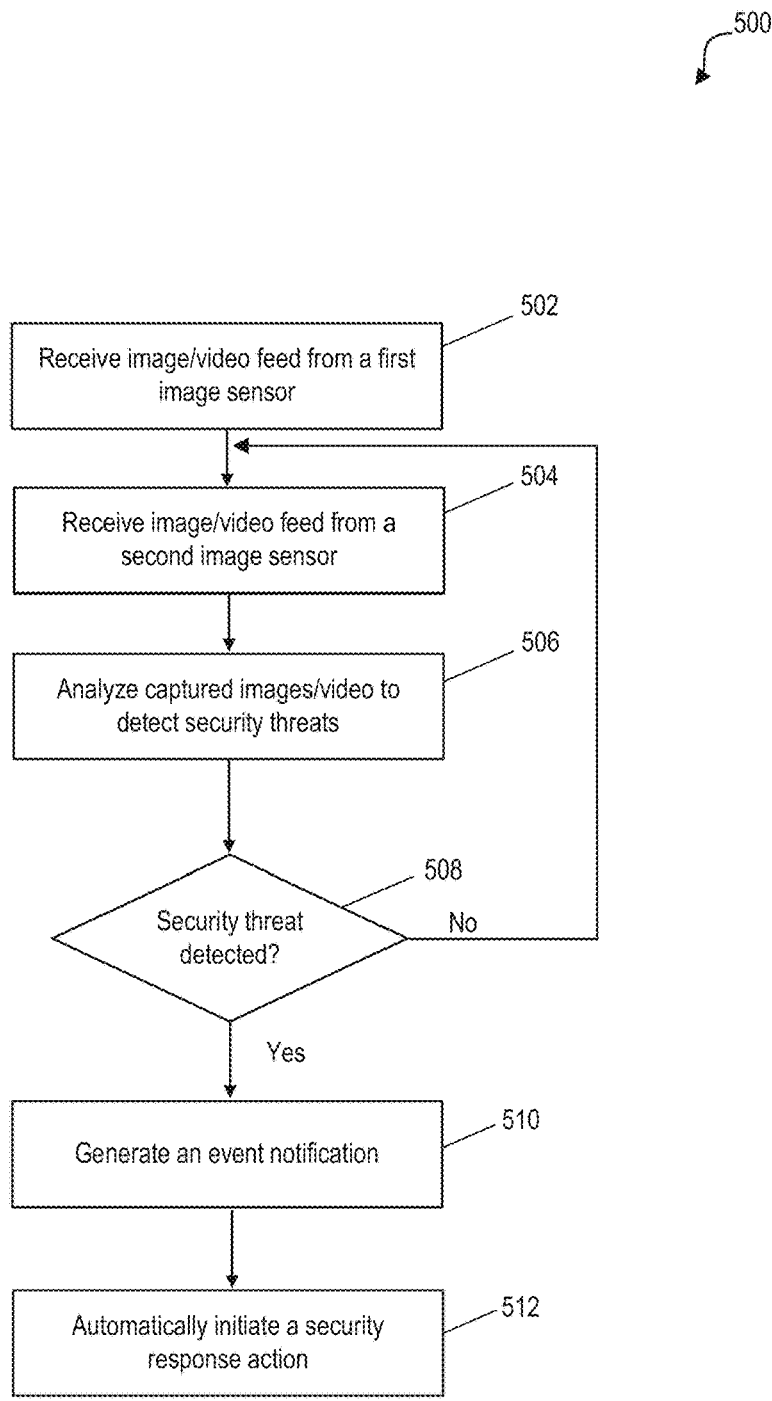
FIG. 5 is an example of a flowchart illustrating a method for recording a mail screening process, in accordance with aspects of the present disclosure.

FIG. 5 is an example of a flowchart illustrating a method 500 for recording a mail screening process, in accordance with aspects of the present disclosure. FIGS. 1-4 may be referenced in combination with the flowchart of FIG. 5. At steps 502 and 504, the DVP 302 may receive one or more live video feeds from one or more cameras 206-208.

More specifically, at step 502, the DVP 302 may receive a live video feed and/or an image capturing a mail item from the first image sensor 206. By way of example only, the DVP 302 may be able to or have the capacity to contain approximately 30 seconds of historic video and/or audio data and/or one or more snapshots. The first image sensor 206 may comprise a 2D image sensor preferably sensitive in a suitable portion of the wavelength region spanning from 700 μm to 1075 μm and preferably with a resolution of at least 320×240 pixels. As noted above, the mail screening apparatus 100 may be operable in either a "Normal" or a "Zoomed" mode. In the Normal mode, a mail item to be inspected is positioned in the primary inspection zone 114, and the focus of the first image sensor 206 may be adjusted so that the image in the primary inspection zone 114 is in focus on the first image sensor 206. The secondary inspection zone 116 is left free of any obstruction, so that the light beam reaching the first image sensor 206 provides images of the contents of the mail disposed in the primary inspection zone 114. Similarly, in the Zoomed mode a mail item to be inspected is positioned in the secondary inspection zone 116, the focus of the first image sensor 206 may be adjusted so that the image in the secondary inspection zone 116 is in focus on the first image sensor 206. In this case the primary inspection zone 114 is left free of any obstruction.

At step 504, the DVP 302 may receive a live video feed and/or an image capturing a mail item from the second image sensor 208. The second image sensor 208 may be configured to record a mail screening process. For example, the second image sensor 208 may record names, mailing addresses and/or any additional information that can be found on the mail item being inspected. Recording performed by the second image sensor 208 may be used to identify points of origin of the mail piece. In other words, the second image sensor 208 may be configured to record what users are seeing on the mail item, while the first image sensor 206 provides a view of the content of the same mail item. The images or video feed received from the first image sensor 206 and the second image sensor 208 can be recorded in separate streams or combined into one stream, e.g., two different views. The first image sensor 206 and/or second image sensor 208 may add a further contextual tag, for example, based on the time information, which may be utilized to form a timestamp. Timestamp information may be used in correlation with the additional sensed information to distinguish an event from other events with similar actions. This comprehensive automatic recording may record information about the mail item being inspected and may enable later investigations of the screening process to make sure the screening process was performed as expected and to help with an investigation of the suspicious mail item(s).

At step 506, the DVP 302 may utilize a video processing algorithm suitable for analyzing captured images in the one or more live video feeds to detect a security threat. For example, the DVP 302 may employ a previously trained Artificial Intelligence (AI) system. In an aspect, the DVP 302 may also receive event notification outputs 306 from the mail screening apparatus 100. In an aspect, the event notification outputs 306 may be generated in response to the detection of a mail threat by the user 401 of the mail screening apparatus 100. As noted above, the display 112 of the mail screening apparatus 100 may include one or more alert buttons that a user 401 may press in response to detecting a potential security threat. In an aspect, the display 112 may render a separate button for each of the following security threats: liquids, powder, weapons, explosives, radiation and suspect material detection. In some cases the DVP 302 may determine that an event notification 406 should be triggered (e.g., when mail security threat is detected), even though such event notification was not triggered by the mail screening apparatus 100. The DVP 302 may determine that an event has occurred based on the combined one or more live video feeds received at least from the first image sensor 206 and the second image sensor 208. For example, the DVP 302 may detect a threat that was missed by the user 401 of the mail screening apparatus 100 (such as a liquid or suspicious powder) and/or if the mail screening apparatus 100 operates in an automatic mode without an operator. In an aspect, final evaluation of the detected security threat may be performed by the user of the security management system 402.

At step 508, the DVP 302 may determine if the security threat is detected as described above. In response to detecting the security threat (step 508, "yes" branch), the DVP 302 may generate an event notification 406 (step 510). In various aspects, notifications 406 may be audible, visual, or both. The notification may also be rendered by different applications, such as computer applications, web-based cloud notifications, or smart phone applications (e.g. Android, iOS, etc.). In an aspect, the notification 406 may include at least one of: a text message, social media notification, phone call, voice mail, emails, and emergency alert notification to a warning system. In an aspect, the notification 406 may comprise an emergency alert notification to the security management system 402, mobile security app, security room software (such as, for example, Video Wall Display, Graphical Map Alert, and the like). In various aspects, the warning system may include at least one of warning lights, warning speakers, and warning displays. In an aspect, the security management system 402 comprises a central broadcasting module, to which each of the monitoring systems is connected and which is capable of broadcasting an audio/video message corresponding to a detected warning condition (security threat).

If no security threat is detected (step 508, "no" branch), the DVP 302 may return to step 502.

In an aspect, after the notification is generated, at step 510, a security response action may be initiated automatically. In an aspect, the security management system 402 and/or the DVP 302 may be configured to employ one or more event notification rules. The one or more event notification rules may be associated with specific security threats and may be predefined by the security personnel. Applying one or more event notification rules may include determining one or more event notification rules applicable to a particular type of detected security threat. Each event notification rule, when applied, identifies one or more security response actions 404 to be triggered in response to the detected event. One exemplary response action 404 may include modification of settings of the HVAC system, in response to detecting suspicious powder. As another non-limiting example, in response to receiving the notification 406 identifying the detected security threat, the security management system 402 may modify room access control rules for the room where the mail screening apparatus 100 is situated. In an aspect, modifying the room access control rules may include selectively granting access to the room based on security credentials or selectively altering the security credentials required to enter the room.

In one aspect, the DVP 302 may be an edge device. In an aspect, the DVP 302 may generate a notification 406 only when a security threat is detected.

Advantageously, various aspects disclosed herein provide integration of the mail screening apparatus 100 with the overall security management system 402. The disclosed system provides centralized detection and management of various security threats by different security applications and enables flexible coordination of customized security responses to various mail threats detected by the mail screening apparatus 100.

In other words, a method 500 for recording a mail screening process includes receiving, by a processor of a recording device, a first image of a mail item placed into an inspection zone of a mail screening device from a first image sensor of the mail screening device. A video stream capturing screening of the mail item is received by the processor of the recording device from a second image sensor of the mail screening device. The first image of the mail item and the video stream of the mail item are analyzed by the recording device to determine if the mail item contains a security threat. A notification is generated, by the processor of the recording device, in response to determining that the mail item contains the security threat.

In one or any combination of these aspects, the method further includes automatically initiating, by the processor of the recording device, a security response action in response to determining that the mail item contains the security threat.

In one or any combination of these aspects, the security response action includes at least one of: modifying room access control rules for the room where the mail screening device is situated, modifying settings of a Heating Ventilating and Air Conditioning (HVAC) system, modifying settings of one or more security cameras mounted in the room where the mail screening device is situated, and generating an audible alert.

In one or any combination of these aspects, the security threat includes one of: liquids, powder, weapons, explosives, radiation and suspect material detection.

In one or any combination of these aspects, modifying room access control rules includes selectively granting access to the room based on security credentials or selectively altering the security credentials required to enter the room.

In one or any combination of these aspects, modifying settings of the HVAC system includes selectively triggering exhaust vents of the HVAC system.

In one or any combination of these aspects, the first image sensor has sensitivity ranging between 700 μm and 1075 μm.

In one or any combination of these aspects, generating the notification comprises generating at least one of: a text message, social media notification, phone call, voice mail, email, electronic notification to a security system, and emergency alert notification to a warning system.

In one or any combination of these aspects, the method further includes sending, by the processor of the recording device, the received video stream capturing the inspection zone to a security gateway.

In one or any combination of these aspects, the warning system includes at least one of: warning lights, warning speakers, and warning displays.

Figure 6:
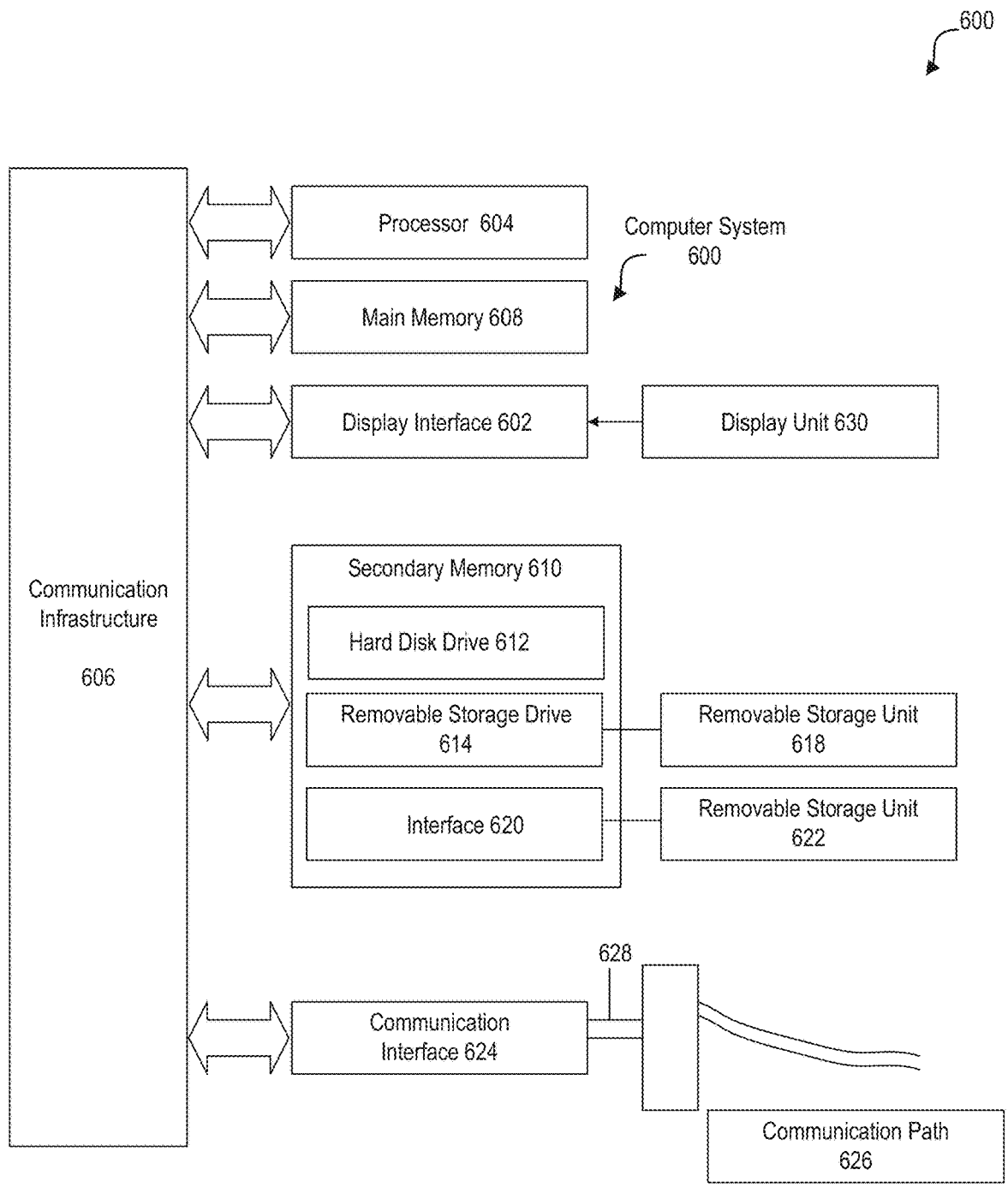
FIG. 6 is an example of a block diagram illustrating various hardware components and other features of the mail screening system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 is an example of a block diagram illustrating various hardware components and other features of a computer system that may operate the DVP 302 in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 604, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 606, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 600, or any other type of connection between computer-related components described herein can be referred to an operable connection, and can include a connection by which entities are operably connected, such that signals, physical communications, and/or logical communications can be sent and/or received. An operable connection can include a physical interface, a data interface and/or an electrical interface.

Computer system 600 can include a display interface 602 that forwards graphics, text, and other data from the communication infrastructure 606 (or from a frame buffer not shown) for display on a display unit 630. Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

It should be understood that a memory, as used herein can include volatile memory and/or non-volatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628, which can be electronic, electromagnetic, optical or other signals capable of being received by communications interface 624. These signals 628 are provided to communications interface 624 via a communications path (e.g., channel) 626. This path 626 carries signals 628 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 614, a hard disk installed in hard disk drive 612, and signals 628. These computer program products provide software to the computer system 600. Aspects of the disclosure are directed to such computer program products.

Computer programs (also referred to as computer control logic) are stored in main memory 608 and/or secondary memory 610. Computer programs can also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software can be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for recording a mail screening process comprising:
   receiving, by a processor of a recording device, a first image of a mail item placed into an inspection zone of a mail screening device from a first image sensor of the mail screening device, wherein the first image is configured to provide a first view of a content inside of the mail item;
   receiving, by the processor of the recording device, a video stream capturing screening of the mail item from a second image sensor of the mail screening device, wherein the video stream is configured to provide a second view of what is seen on the mail item;

analyzing, using the processor of the recording device, the first image and the video stream of the mail item to determine if the mail item contains a security threat;

generating, by the processor of the recording device, a notification in response to determining that the mail item contains the security threat; and providing a side-by-side display of the first view in real time of the content inside of the mail item and the second view in real time of what is seen on the mail item.

2. The method of claim 1, further comprising automatically initiating, by the processor of the recording device, a security response action in response to determining that the mail item contains the security threat.

3. The method of claim 2, wherein the security response action comprises at least one of: modifying room access control rules for a room where the mail screening device is situated, modifying first settings of a Heating Ventilating and Air Conditioning (HVAC) system, modifying second settings of one or more security cameras mounted in the room where the mail screening device is situated, and generating an audible alert.

4. The method of claim 1, wherein the security threat comprises one of: liquids, powder, weapons, explosives, radiation and suspect material detection.

5. The method of claim 3, wherein modifying the room access control rules comprises selectively granting access to the room based on security credentials or selectively altering the security credentials required to enter the room.

6. The method of claim 3, wherein modifying the first settings of the HVAC system comprises selectively triggering exhaust vents of the HVAC system.

7. The method of claim 1, wherein the first image sensor has sensitivity ranging between 700 μm and 1075 μm.

8. The method of claim 1, wherein generating the notification comprises generating at least one of: a text message, social media notification, phone call, voice mail, email, electronic notification to a security system, and emergency alert notification to a warning system.

9. The method of claim 1, further comprising sending, by the processor of the recording device, the video stream capturing the inspection zone to a security gateway.

10. The method of claim 8, wherein the warning system comprises at least one of: warning lights, warning speakers, and warning displays.

11. A system for recording a mail screening process comprising:
   a hardware processor of a recording device configured to:
      receive a first image of a mail item placed into an inspection zone of a mail screening device from a first image sensor of the mail screening device, wherein the first image is configured to provide a first view of a content inside of the mail item;
      receive a video stream capturing screening of the mail item from a second image sensor of the mail screening device, wherein the video stream is configured to provide a second view of what is seen on the mail item;
      analyze the first image and the video stream of the mail item to determine if the mail item contains a security threat;
      generate a notification in response to determining that the mail item contains the security threat; and
      provide a side-by-side display of the first view in real time of the content inside of the mail item and the second view in real time of what is seen on the mail item.

12. The system of claim 11, wherein the hardware processor of the recording device is further configured to automatically initiate a security response action in response to determining that the mail item contains the security threat.

13. The system of claim 12, wherein the security response action comprises at least one of: modifying room access control rules for a room where the mail screening device is situated, modifying first settings of a Heating Ventilating and Air Conditioning (HVAC) system, modifying second settings of one or more security cameras mounted in the room where the mail screening device is situated, and generating an audible alert.

14. The system of claim 11, wherein the security threat comprises one of: liquids, powder, weapons, explosives, radiation and suspect material detection.

15. The system of claim 13, wherein the hardware processor of the recording device configured to modify the room access control rules is further configured to selectively grant access to the room based on security credentials or selectively alter the security credentials required to enter the room.

16. The system of claim 13, wherein the hardware processor of the recording device configured to modify the first settings of the HVAC system is further configured to selectively trigger exhaust vents of the HVAC system.

17. The system of claim 11, wherein the first image sensor has sensitivity ranging between 700 μm and 1075 μm.

18. The system of claim 11, wherein the hardware processor of the recording device configured to generate the notification is further configured to generate at least one of: a text message, social media notification, phone call, voice mail, email, electronic notification to a security system, and emergency alert notification to a warning system.

19. The system of claim 11, wherein the hardware processor of the recording device is further configured to send the video stream capturing the inspection zone to a security gateway.

20. The system of claim 18, wherein the warning system comprises at least one of: warning lights, warning speakers, and warning displays.

21. A method for recording a mail screening process comprising:
   receiving, by a processor of a recording device, a first image of a mail item placed into an inspection zone of a mail screening device from a first image sensor of the mail screening device, wherein the first image is configured to provide a first view of a content inside of the mail item;
   receiving, by the processor of the recording device, a live video feed capturing screening of the mail item from a second image sensor, wherein the live video feed is configured to provide a second view of what is seen on the mail item;
   analyzing, using the processor of the recording device, the first image and the live video feed of the mail item to determine if the mail item contains a security threat;
   generating, by the processor of the recording device, a notification in response to determining that the mail item contains the security threat; and
   providing a side-by-side display of the first view in real time of the content inside of the mail item and the live video feed that provides the second view in real time of what is seen on the mail item.

* * * * *